United States Patent
Derakhshan et al.

(10) Patent No.: US 7,430,420 B2
(45) Date of Patent: Sep. 30, 2008

(54) CELL SELECTION AND INTER-FREQUENCY HANDOVER

(75) Inventors: Fariborz Derakhshan, Nuremberg (DE); Enrico Jugl, Nuremberg (DE); Mirko Schacht, Allersberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 185 days.

(21) Appl. No.: 11/021,554

(22) Filed: Dec. 23, 2004

(65) Prior Publication Data

US 2006/0142032 A1   Jun. 29, 2006

(51) Int. Cl.
*H04Q 7/20* (2006.01)

(52) U.S. Cl. .............. 455/452.2; 455/176.1; 455/180.1; 455/188.1; 455/266; 455/436; 455/450; 370/331; 370/332; 370/468

(58) Field of Classification Search ................ 455/436, 455/437, 438, 439, 442, 443, 444, 450, 452.1, 455/452.2, 464, 509, 525, 10, 62, 63.1, 67.11, 455/67.12, 115.4, 161.1, 176.1, 180.1, 188.1, 455/266; 370/331, 332, 395.14, 431, 468
See application file for complete search history.

(56) References Cited

U.S. PATENT DOCUMENTS

| | | | | |
|---|---|---|---|---|
| 5,862,489 | A | * | 1/1999 | Aalto ......................... 455/522 |
| 6,041,235 | A | * | 3/2000 | Aalto ......................... 455/437 |
| 6,091,955 | A | * | 7/2000 | Aalto et al. ................. 455/447 |
| 6,208,631 | B1 | * | 3/2001 | Kim ............................ 370/332 |

(Continued)

FOREIGN PATENT DOCUMENTS

WO    WO03/103324    12/2003

(Continued)

OTHER PUBLICATIONS

Brüggen et al.,"Capacity Improvement in UMTS by Dedicated Radio Resource Management", Proceedings of IEEE Vehicular Technology Conference VTC 2002-Fall, pp. 1284-1288, 2002.

(Continued)

*Primary Examiner*—William Trost
*Assistant Examiner*—James D Ewart

(57) ABSTRACT

The present invention provides a method and an apparatus for controlling a communications system that includes a mobile wireless device, a first and a second base station and a radio network controller. The communications system may allocate frequency bands to users on a multiplicity of channels associated with a multi-layer access network across at least two cells communicatively coupled to a first and a second base station, respectively. The method comprises monitoring a radio emission parameter associated with the first and second base stations that communicate with the mobile wireless device. A radio emission parameter associated with the first and second base stations, such as signal strength or quality, is monitored, to select a target cell among a set of candidate cells for the mobile wireless device and to transfer the mobile wireless device from a first frequency band to a second frequency band. For example, radio resource management algorithms may cause emission-controlled cell selection and inter-frequency handover from a first frequency band to a second frequency band with a transmit power level lower than that of the first frequency band. In accordance with one aspect of the instant application, electromagnetic exposure to a user of the mobile wireless device is substantially decreased, resulting in lower energy costs and reduced environmental impacts.

3 Claims, 10 Drawing Sheets

U.S. PATENT DOCUMENTS

| | | | |
|---|---|---|---|
| 6,240,291 B1 * | 5/2001 | Narasimhan et al. | 455/436 |
| 6,456,847 B1 * | 9/2002 | Lilja et al. | 455/437 |
| 6,480,522 B1 * | 11/2002 | Hoole et al. | 375/130 |
| 6,504,828 B1 * | 1/2003 | Corbett | 370/331 |
| 6,549,524 B1 * | 4/2003 | Shin | 370/331 |
| 6,810,252 B1 * | 10/2004 | Kwon | 455/436 |
| 6,904,029 B2 * | 6/2005 | Fors et al. | 370/331 |
| 6,917,808 B1 * | 7/2005 | Nelson | 455/436 |
| 7,236,787 B1 * | 6/2007 | Tamura et al. | 455/437 |
| 2002/0027890 A1 * | 3/2002 | Bernstein et al. | 370/331 |
| 2002/0147008 A1 * | 10/2002 | Kallio | 455/426 |
| 2003/0162535 A1 * | 8/2003 | Nishiyama et al. | 455/422 |
| 2003/0218995 A1 * | 11/2003 | Kim et al. | 370/318 |
| 2004/0259548 A1 * | 12/2004 | Moon et al. | 455/436 |
| 2005/0026614 A1 * | 2/2005 | Otsuka et al. | 455/436 |
| 2005/0037757 A1 * | 2/2005 | Moon et al. | 455/436 |

FOREIGN PATENT DOCUMENTS

| | | |
|---|---|---|
| WO | WO 03103324 A1 * | 12/2003 |
| WO | WO2004/040935 | 5/2004 |
| WO | WO 2004040935 A1 * | 5/2004 |

OTHER PUBLICATIONS

3GPP TS 25.304 V3.11.0 (Jun. 2002): "UE Procedures in Idle Mode and Procedures for Cell Reselection in Connected Mode" (Release 1999).

J. Mückenheim, U. Bernhard: "A Framework On Load Control in 3rd Generation CDMA Networks", Lucent Technologies Technical Report, IDT-01-41569J, Jun. 2001.

Jugl et al., "Performance Evaluation of Dynamic Data Rate Adaptation of the UMTS Dedicated Channel" DBC 2003.

European Search Report for Application No. 05257619.6-2412 dated Mar. 15, 2005.

"Load Sharing Methods in a WCDMA Macro Multi-Carrier Scenario" by Andrea Fiorini and Riccardo De Bernardi, Ericsson Telecomuniacazioni S.p.A., Vimodrone, Milano, Italy—2003 IEEE.

* cited by examiner

CELL SELECTION AND INTER-FREQUENCY HANDOVER

BACKGROUND OF THE INVENTION

1. Field of the Invention

This invention relates generally to telecommunications, and more particularly, to wireless communications.

2. Description of the Related Art

Many service providers or network operators provide data and/or voice communication services over networks. A mobile wireless device may be used to avail these data and/or voice communication services. The information and/or communications for such services may be transmitted across a wireless telecommunications system according to one or more protocols. A wireless telecommunications system typically includes a plurality of base stations distributed within an area to be serviced by a digital cellular network. A transmitter in a mobile wireless device may exchange data across an air interface with a receiver in a base station and vice versa.

To meet the needs of growing market for the data and/or voice communication services, the service providers or network operators manage a host of radio resources, such as pan-European Global System of Mobile Communications (GSM) and Code Division Multiple Access (CDMA) cellular networks. In operation, various users within the area, fixed or mobile, may access the wireless telecommunications system and, thus, other interconnected telecommunications systems, via one or more of the base stations.

As a user moves across a network service region, a mobile wireless device maintains communications with the wireless telecommunications system as the mobile wireless device passes through an area by communicating with one and then another base station. The mobile wireless device may communicate with the closest base station, the base station with the strongest signal, the base station with a capacity sufficient to accept communications, etc. For a mobile wireless device to discontinue communications with a first base station and begin communications with a second base station when providing data and/or voice communications, a process known as soft hand off (SHO) was developed in the CDMA and UMTS systems to have multiple connections in the region of overlapped coverage.

During a conversation, for example, a mobile wireless device or a mobile terminal or a Mobile Station (MS), such as User Equipment (UE) often changes a cell. This cell change or transfer procedure is generally called handover. To decide when a handover is necessary, the mobile wireless device and a base station makes certain measurements during the conversation. For example, a GSM network may broadcast the mobile wireless device a list of neighboring cells to be measured. The measurements may be sent by a channel to the base station and therefore also to a Radio Network Controller (RNC). The RNC connects the base station to a Core Network (CN). Using these measurements from the mobile wireless device, the RNC may determine a cell, among the neighboring cells, which could be used for an eventual handover.

For example, a term "C1" generally represents a cell selection criterion. Specifically, the C1 criterion also called a path loss criterion refers to a value crucial in an idle mode during the selection of a cell. The C1 criterion decides which cell should be used by the mobile wireless device in an idle mode. A cell may only be used by a mobile terminal if the C1 criterion is higher than 0. Although the cell selection described here applies to GSM systems, such a cell selection is equally useful in other systems, such as Universal Mobile Telecommunication System (UMTS) systems. The mobile wireless device in the idle mode (or a stand-by mode) always uses the cell with the highest C1. That is, a cell can be used then by a phone as a current cell, if its calculated C1 is larger than 0. The C1 criterion may be calculated as follows: C1= (RX−RXLEV_ACCESS_MIN−MAX ((MX_TXPWR_MAX_CCH−MS_MAX_TXPWR), 0)). The term RX refers to a current receipt level, the term RXLEV_ACCESS_MIN refers to a minimum access receipt level into a cell, the term MX_TXPWR_MAX_CCH refers to a maximum transmitting power a mobile wireless device may use when accessing this cell on a control channel (CCH), and the term MS_MAX_ TXPWR refers to a maximum possible transmitting power of the mobile wireless device.

However, hazards arising from electromagnetic waves due to transmitting power of mobile wireless devices are not adequately addressed from a medical point of view. One way to achieve public acceptance and/or to minimize electromagnetic exposure is to operate wireless 3G and 4G telecommunications systems, such as third and forth generation (3G and 4G) telecommunications systems at a minimum power level. Thus, reduction of emission power of the base stations in wireless telecommunications systems and development of such radio resource management techniques that keep the emission power of the base stations at a minimum level is desirable.

Specifically, the base stations (i.e., Node Bs) in conventional Third Generation Partnership Project (3GPP) based UMTS networks operate at carrier frequencies of about 2000 MHz with a maximum transmit power of 43 dBm. About 10% of this power is continuously used for the transmission of a common pilot channel (CPICH), giving rise to permanent interference and radio emission. A reduction of the radiation density of base stations can be achieved by lowering the transmit power of the common pilot channel. This reduces the interference level throughout the entire network and therewith the power of all users as well. On the other hand, the common pilot channel is one of the key factors for guaranteeing radio coverage. A reduction of pilot power generally results in higher failure rates due to the loss of coverage. Thus, more base stations are required to ensure the coverage leading to much higher installation costs.

Another approach calls for employing UMTS in lower frequency bands, e.g. 900 MHz or 450 MHz. The lower frequency bands provide a relatively better radio propagation properties and path loss will be much lower. Thus, using lower frequencies generally leads to lower emission power of the CPICH and consequently decreases the radiation density of the base stations.

However, when diverse radio access networks, such as 3G and 4G mobile telecommunication systems with different frequency bands are collocated, management of radio resources becomes difficult. Especially, with regard to emission reduction of the base stations, common radio resource management algorithms for load balancing among many frequency bands are not available.

Handover algorithms are not specified in the 3GPP-UMTS standards. Based on standardized measurements, most handover algorithms are vendor-specific. In one UMTS-based realization of an inter-frequency handover algorithm, handover control is primarily focused on the maintenance of the quality requirements of services. Moreover, inter-frequency handover algorithms in UMTS networks choose a target cell with the highest $E_c/N_t$ value on the CPICH among all monitored cells. But the highest $E_c/N_t$ value on CPICH does not always map onto the channel with the best radio propagation condition or the lowest radio emission. The term $E_c/N_t$ is the ratio of the received pilot power to the total interference.

Interference in this case is defined as the sum of all received CDMA power from other sectors and the thermal noise. Regarding cell selection, corresponding algorithms specified in the 3GPP-UMTS standards are based on quality measurements.

One disadvantage of the cell selection and the inter-frequency handover algorithms set forth is that it is possible that a cell with worse $E_c/N_t$ emits less power since base station locations may be different for different network layers. For the same reason, the value of $E_c/N_t$ is not necessarily linked to a load condition of a cell. Furthermore, "power-optimized" assignment of users to macro cells using lower frequency bands and to micro cells using higher frequency bands depends on the location of the user and the load conditions of the cells. As a consequence, efficient allocation of users to a proper frequency band in multi-layer networks may not be achieved.

The present invention is directed to overcoming, or at least reducing, the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for allocating frequency bands to users on a multiplicity of channels associated with a multi-layer access network across at least two cells communicatively coupled to a first and a second base station, respectively. The method comprises monitoring a radio emission parameter associated with the first and second base stations. Based on the radio emission parameter of the first and second base stations, a target cell may be selected among at least two cells for a mobile wireless device. The mobile wireless device may be transferred from a first frequency band to a second frequency band. For example, the second frequency band may be with a transmit power level lower than that of the first frequency band or vice versa.

In another embodiment, a method is provided for controlling a communications system including a first and second base station and a radio network controller. The method comprises monitoring a radio emission parameter associated with the first and second base stations, executing instructions at a mobile wireless device to reduce the emission of radio transmit power from the first and second base stations, executing instructions at the radio network controller to cause an inter-frequency handover for a user of the mobile wireless device. In this way, a lower frequency band may be allocated to a user on a multiplicity of channels associated with a multi-layer access network across at least two cells communicatively coupled to the first and second base stations, respectively.

In yet another embodiment, a communications system comprises a first and a second base station, a radio network controller coupled thereto and a storage coupled to the radio network controller. The storage may store instructions to cause an inter-frequency handover for a user of a mobile wireless device that monitors a radio emission parameter associated with the first and second base stations. This monitoring may enable allocation of a lower frequency band to the user on a multiplicity of channels associated with a multi-layer access network across at least two cells communicatively coupled to the first and second base stations, respectively while reducing the emission of radio transmit power from the first and second base stations.

In still another embodiment, an article comprising a computer readable storage medium storing instructions that, when executed cause a system to monitor a radio emission parameter associated with a first and a second base station for allocating frequency bands to users on a multiplicity of channels associated with a multi-layer access network across at least two cells communicatively coupled to the first and second base stations, respectively. Based on the radio emission parameter of the first and second base stations, the system may select a target cell among the two cells for a mobile wireless device and transfer the mobile wireless device from a first frequency band to a second frequency band with a transmit power level lower than that of the first frequency band.

In further embodiment, an article comprising a computer readable storage medium storing instructions that, when executed cause a system to monitor a radio emission parameter associated with the first and second base stations, execute instructions at a mobile wireless device to reduce the emission of radio transmit power from the first and second base stations, execute instructions at the radio network controller to cause an inter-frequency handover for a user of the mobile wireless device and allocate a lower frequency band to the user on a multiplicity of channels associated with a multi-layer access network across at least two cells communicatively coupled to the first and second base stations, respectively.

In one exemplary embodiment, an apparatus may allocate frequency bands to users on a multiplicity of channels associated with a multi-layer access network across at least two cells communicatively coupled to a first and a second base station, respectively. The apparatus comprises means for monitoring a radio emission parameter associated with the first and second base stations and means for selecting a target cell among at least two cells for a mobile wireless device and transferring the mobile wireless device from a first frequency band to a second frequency band based on the radio emission parameter of the first and second base stations. For example, the second frequency band may be with a transmit power level lower than that of the first frequency band or vice versa In one illustrative embodiment, an apparatus may control a communications system that includes a first and second base station and a radio network controller. The apparatus comprises means for monitoring a radio emission parameter associated with the first and second base stations, means for executing instructions at a mobile wireless device to reduce the emission of radio transmit power from the first and second base stations, means for executing instructions at the radio network controller to cause an inter-frequency handover for a user of the mobile wireless device and means for allocating a lower frequency band to the user on a multiplicity of channels associated with a multi-layer access network across at least two cells communicatively coupled to the first and second base stations, respectively.

BRIEF DESCRIPTION OF THE DRAWINGS

The invention may be understood by reference to the following description taken in conjunction with the accompanying drawings, in which like reference numerals identify like elements, and in which.

Figure 1:
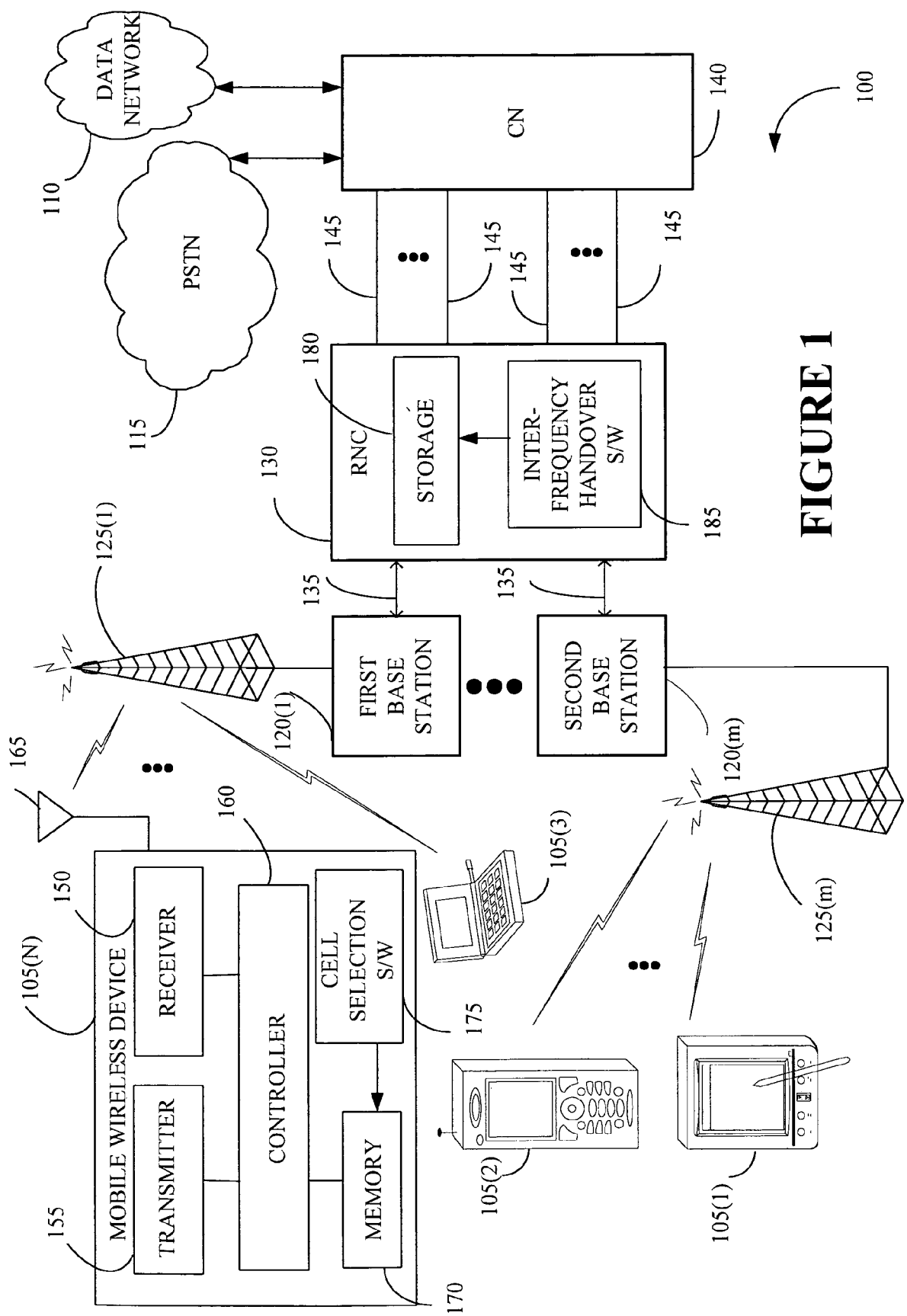
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and an apparatus for controlling a communications system that includes a mobile wireless device, a first and a second base station and a radio network controller to provide a wireless service. To provide the wireless service to a user, the first and second base stations may transmit and receive messages from a plurality of mobile wireless devices, e.g., cellular phones, in a cell that may be divided into multiple sectors. A wireless communications system may allocate frequency bands to users on a multiplicity of channels associated with a multi-layer access network across at least two cells communicatively coupled to a first and a second base station, respectively. The method comprises monitoring a radio emission parameter associated with the first and second base stations that communicate with the mobile wireless device. A radio emission parameter associated with the first and second base stations, such as signal strength or quality, is monitored, to select a target cell among a set of candidate cells for the mobile wireless device and to transfer the mobile wireless device from a first frequency band to a second frequency band with a transmit power level lower than that of the first frequency band. For example, radio resource management algorithms may cause emission-controlled cell selection and inter-frequency handover. In this manner, a base station coupled to a radio network controller may enable an emission-controlled cell selection and/or an inter-frequency handover for a cellular network user in a mobile telecommunications system. Accordingly, electromagnetic exposure to a user of a mobile wireless device is substantially decreased, resulting in significantly lower energy costs and substantially reduced environmental impacts.

Referring to FIG. 1, a communications system 100 is illustrated, in accordance with one embodiment of the present invention. Examples of the communications system 100 of FIG. 1 include a Universal Mobile Telecommunication System (UMTS), although it should be understood that the present invention may be applicable to other systems that support data and/or voice communication. Using the communications system 100, one or more mobile wireless devices 105(1-N) may communicate with a data network 110, such as the Internet, and/or a public telephone system (PSTN) 115 through one or more base stations including a first and a second base station 120(*l-m*).

Persons of ordinary skill in the pertinent art should appreciate that the communications system 100 is not limited to the mobile wireless devices 105(1-N) and the first and a second base station 120(*l-m*). Those skilled in the art will also appreciate that the communications system 100 enables the mobile wireless devices 105(1-N) to communicate with the data network 110 and/or the PSTN 115. It should be understood, however, that the configuration of the communications system 100 of FIG. 1 is exemplary in nature, and that fewer or additional components may be employed in other embodiments of the communications system 100 without departing from the spirit and scope of the instant invention. For example, any desirable number of communication devices may be included in the communications system 100. Furthermore, the communication devices may include any desirable number of the mobile wireless devices 105(1-N) and/or the first and a second base stations 120, as well as any other desirable type of device.

In one embodiment, wireless communications the mobile wireless devices 105(1-N) and the first and a second base station 120(*l-m*) may be established according to any one or more of network and/or communication protocols including, but not limited to, a UMTS protocol, a Global System for Mobile communications (GSM) protocol, a Code Division Multiple Access (CDMA) protocol, and the like. Use of a particular protocol in the communications system 100 to communicate over a wireless communication medium is a matter of design choice and not necessarily material to the present invention. Thus, only relevant aspects of the communications system 100 that are material to the instant invention are described below.

While the first base station 120(*l*) may couple to a first antenna 125(*l*), the second base station 120(*m*) may couple to a first antenna 125(*m*) for wirelessly communicating with any one of the mobile wireless devices 105(1-N). The mobile wireless device 105 may take the form of any of a variety of devices, including cellular phones, personal digital assistants (PDAs), laptop computers, digital pagers, wireless cards, and any other device capable of accessing the data network 110 and/or the PSTN 115 through the first and second base stations 120(*l-m*).

According to one embodiment, the first and second base stations 120(*l-m*) may be coupled to a Radio Network Controller (RNC) 130 by one or more connections 135, such as T1/E1 lines or circuits, ATM virtual circuits, cables, optical digital subscriber lines (DSLs), and the like. Although one RNC 130 is illustrated, those skilled in the art will appreciate that a plurality of RNCs 130 may be utilized to interface with a large number of base stations 120. Generally, the RNC 130 operates to control and coordinate the first and second base stations 120(*l-m*) to which it is connected. The RNC 130 of FIG. 1 generally provides replication, communications, runtime, and system management services, and, as discussed below in more detail below, may be involved in coordinating the transition of the mobile wireless device 105(*l*) during transitions between the first and second base stations 120(*l-m*).

Consistent with one embodiment, the RNC 130 may be coupled to a Core Network (CN) 140 via a connection 145, which may take on any of a variety of forms, such as T1/E1 lines or circuits, ATM virtual circuits, cables, optical digital subscriber lines (DSLs), and the like. Generally the CN 140 operates as an interface to the data network 110 and/or to the public telephone system (PSTN) 115. The CN 140 performs a variety of functions and operations, such as user authentication, however, a detailed description of the structure and operation of the CN 140 is not necessary to an understanding and appreciation of the instant invention. Accordingly, to avoid unnecessarily obfuscating the instant invention, further details of the CN 140 are not presented herein.

The mobile wireless device 105(N) is shown to include a receiver 150, a transmitter 155, a controller 160, an antenna 165, a memory 170 storing instructions, such as a cell selection software (S/W) 175. The controller 160, in the illustrated embodiment, controls the flow of information between the first and second base stations 120(*l-m*) and the RNC 130. The RNC 130 may comprise a storage 180 storing instructions, such as an inter-frequency handover software (S/W) 185. However, persons of ordinary skill in the art should appreciate that the present invention is not so limited. That is, instructions of the cell selection S/W 175 and the inter-frequency handover S/W 185 may be implemented in any desirable number of entities and may be stored in other desirable forms, such as firmware and/or hardware logic.

In one embodiment, the transmitter 155 may transmit one or more encoded signals provided by the controller 160 using the antenna 165 and the receiver 150 may receive encoded signals. Likewise, each base station 120 is capable of transmitting and receiving signals. For example, the mobile wireless device 105(*l*) and the first and second base stations 120 (*l-m*) may exchange a variety of frames including control frames, data frames, fill frames, and idle frames over an air interface.

In this manner, using the S/W 175, the controller 160 generally operates to control both the transmission and reception of data and control signals over the antenna 165 on a multiplicity of channels including a shared channel, a data channel, and a control channel and to communicate information to and from the RNC 130 via the transmitter 155 and the receiver 150, respectively. Using the S/W 185, the multiplicity of channels may be used to effect a controlled scheduling of communications from the mobile wireless device 105(N) to the first and/or the second base stations 120(*l-m*).

Figure 2:
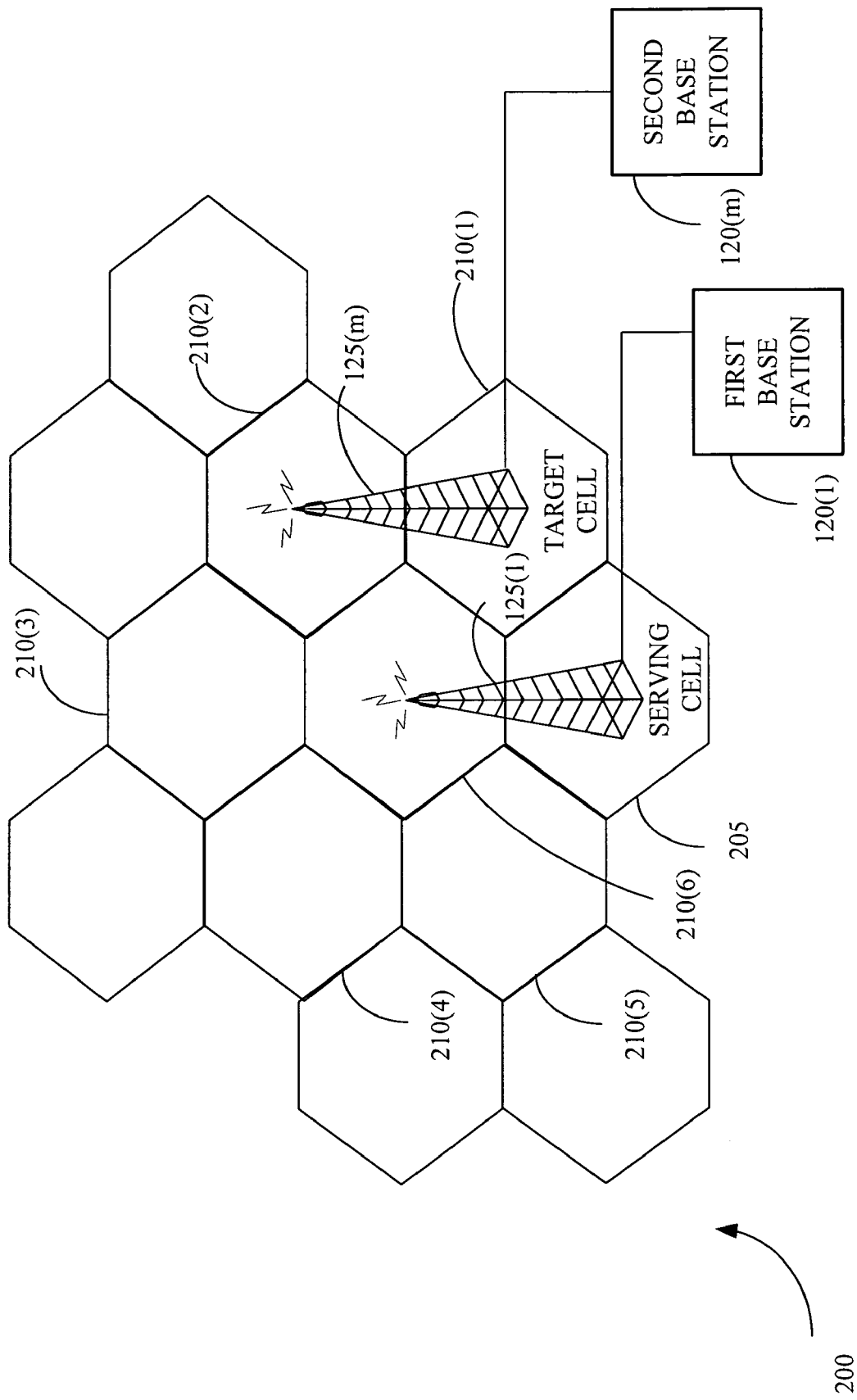
FIG. 2 is a stylistic representation of a region in which the communications system of FIG. 1 may be employed according to one embodiment of the present invention.

As is illustrated in FIG. 2, an area 200 to be serviced by the communications system 100 is separated into a plurality of regions or cells, each being associated with a separate base station 120. Typically, each cell has a plurality of adjacent neighboring cells. For example, a serving cell 205 has six neighboring cells 210(1-6) such that the mobile wireless device 105(*l*) entering the serving cell 205 may travel from one of the neighboring cells 210(1-6).

In FIG. 2, it is assumed that a transmission is underway with respect to the mobile wireless device 105(N) such that the mobile wireless device 105(N) is communicating with the first base station 120(*l*), but will be transitioning to the second base station 120(*m*). Thus, as the mobile wireless device 105(*l*) enters the cell 205 from any of the neighboring cells 210(1-6), the mobile wireless device 105(*l*) may need to transition from communicating with the serving cell 205 to communicating with a target cell 210(*l*) that it is entering.

Figure 3:
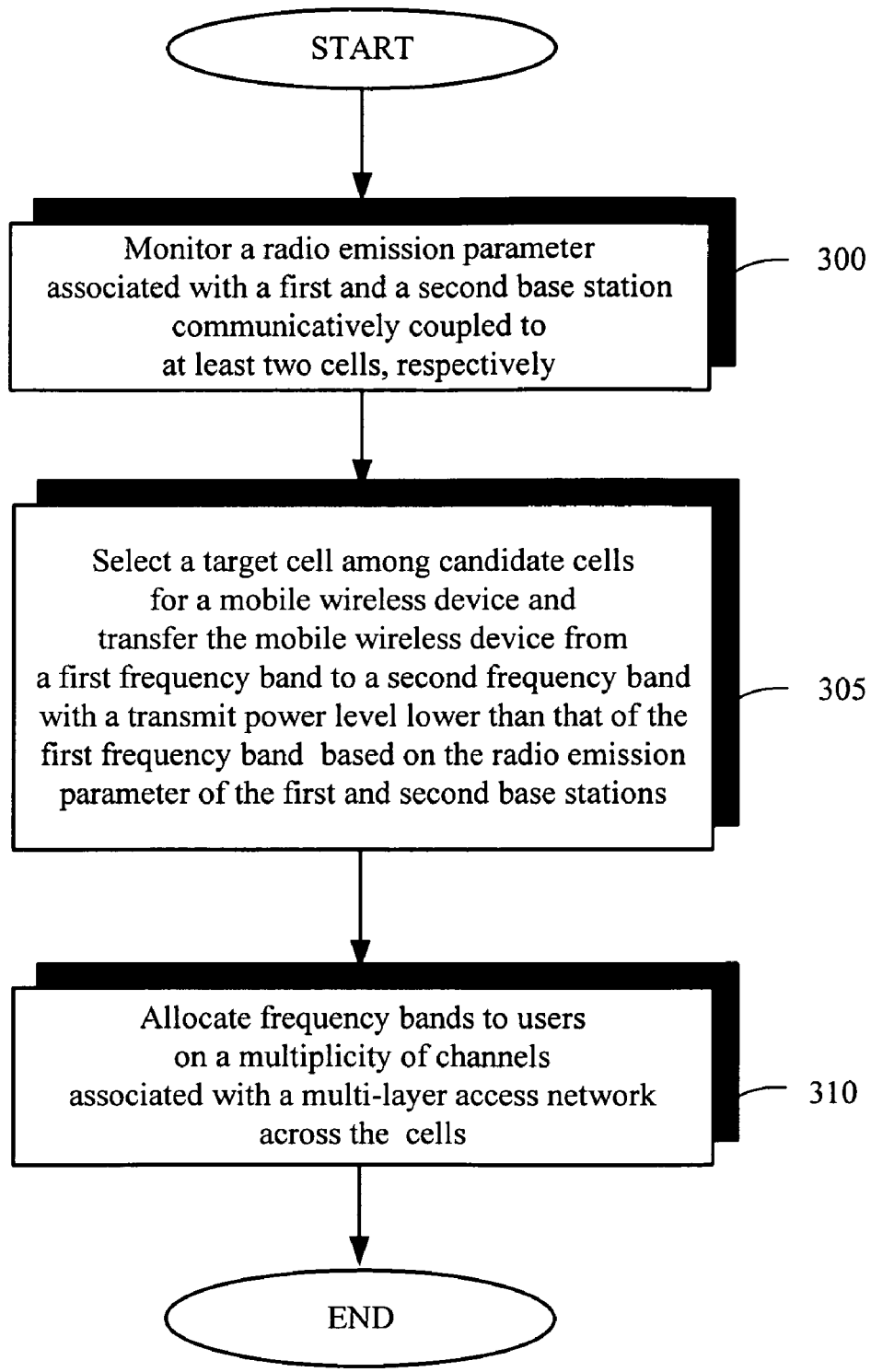
FIG. 3 is a flow diagram illustrating one embodiment of the interoperation of the various components including a cell selection algorithm at a mobile wireless device and an inter-frequency handover algorithm at a radio network controller coupled to a first and a second base station of the communications system of FIGS. 1 and 2.

Turning now to FIG. 3, a flow diagram illustrating the interoperation of the various components of the communications system 100 is shown. Initially, the wireless device 105 (N) is within the serving cell 205 associated with the first base station 120(*l*) and is approaching or entering the target cell 210(*l*) associated with the second base station 120(*m*). In one embodiment, a cell selection strategy may be employed at the mobile wireless device 105(N) and an inter-frequency handover strategy may be employed at the RNC 130 that is coupled to the first and second base stations 120(*l-m*) of the communications system 100, as shown in FIGS. 1 and 2.

The process of cell selection and inter-frequency handover begins at block 300 with the mobile wireless device 105(N) monitoring certain parameters including a radio emission parameter of the first and second base stations 120(*l-m*), which may be in its active set to determine the quality of communications. While a communications session is only established with the serving cell 205, the mobile wireless device 105(N), using the cell selection S/W 175 nonetheless monitors one or more channels of the other base stations in its active set that would be available should an emission-controlled cell selection and/or inter-frequency handover occur.

In this manner, the mobile wireless device 105(N) and the RNC 130, using the monitored radio emission parameters of each of the first and second base stations 120(*l-m*) determine a cell selection and/or whether an inter-frequency handover is warranted. At block 305, using the inter-frequency handover S/W 185, the RNC 130 selects the target cell 210(*l*) among candidate cells 210(1-6) based on the radio emission parameters of the first and second base stations 120(l-m) for the mobile wireless device 105(N).

If an inter-frequency handover is warranted, the RNC 130 may transfer the mobile wireless device 105(N) from a first frequency band to a second frequency band with a transmit power level lower than that of the first frequency band. At block 310, the communications system 100 may allocate frequency bands to users on a multiplicity of channels associated with a multi-layer access network across at least two cells, i.e., the serving cell 205 and the target cell 210(l). In the illustrated embodiment, the serving cell 205 and the target cell 210(l) are controlled by different base stations 120(l) and 120(m), respectively.

According to one exemplary embodiment of the present invention, as shown in FIG. 3, the RNC 130 may determine whether or not there is a need to switchover from communications between the mobile wireless device 105(N) and the first base station 120(l) to communications between the mobile wireless device 105(N) and the second base station 120(m). To this end, a messaging process may be used to switch over from the serving cell 205 to the target cell 210(l). Generally, an actual cell switchover starts when the RNC 130 sends Radio Link Reconfiguration Commit messages to the first base station 120(l) to cease any scheduled transmission at a defined time. The mobile wireless device 105(N) begins "listening" to scheduling information from the target cell 210(l) at the defined time after sending "Physical Channel Reconfiguration Complete" messages.

The first and second base stations 120(l-m) may periodically report Signal to Interference Ratio (SIR) measurements to the RNC 130. The RNC 130 may use feedback of the radio channel conditions, such as SIR from the first and second base stations 120(l-m) in the active set or mobile reported best cell measurement, to trigger switching from the serving cell 205 to the target cell 210(l). However, persons of ordinary skill in the art should appreciate that any desirable combination of such measurements or other parameters may determine this switching.

Generally, in one embodiment of the present invention, a conventional signaling may be used to identify the serving cell 205 during a cell selection after measurements of the radio emission parameters made by the mobile wireless device 105(N) indicate that the best cell is not the serving cell 205. Based on these measurements of the radio emission parameters, the mobile wireless device 105(N) indicates its new primary serving cell, i.e., the target cell 210(l). Once the cells 210(1-6) receive the indication of the new primary serving cell from the mobile wireless device 105(N), all cells send the primary/non-primary cell indications to the RNC 130. The RNC 130 responds by switching user plane traffic to a transport interface of the new primary or target cell 210(l) using signaling messages.

During a soft handover, for example, the RNC 130 may send the following information to the mobile wireless device 105(N): the cells that the wireless device 105(N) should be monitoring; the radio channel information for any new cells to be monitored. However, the RNC 130 may periodically re-assign which cells in the active set that the mobile wireless device 105(N) should monitor.

Figure 4:
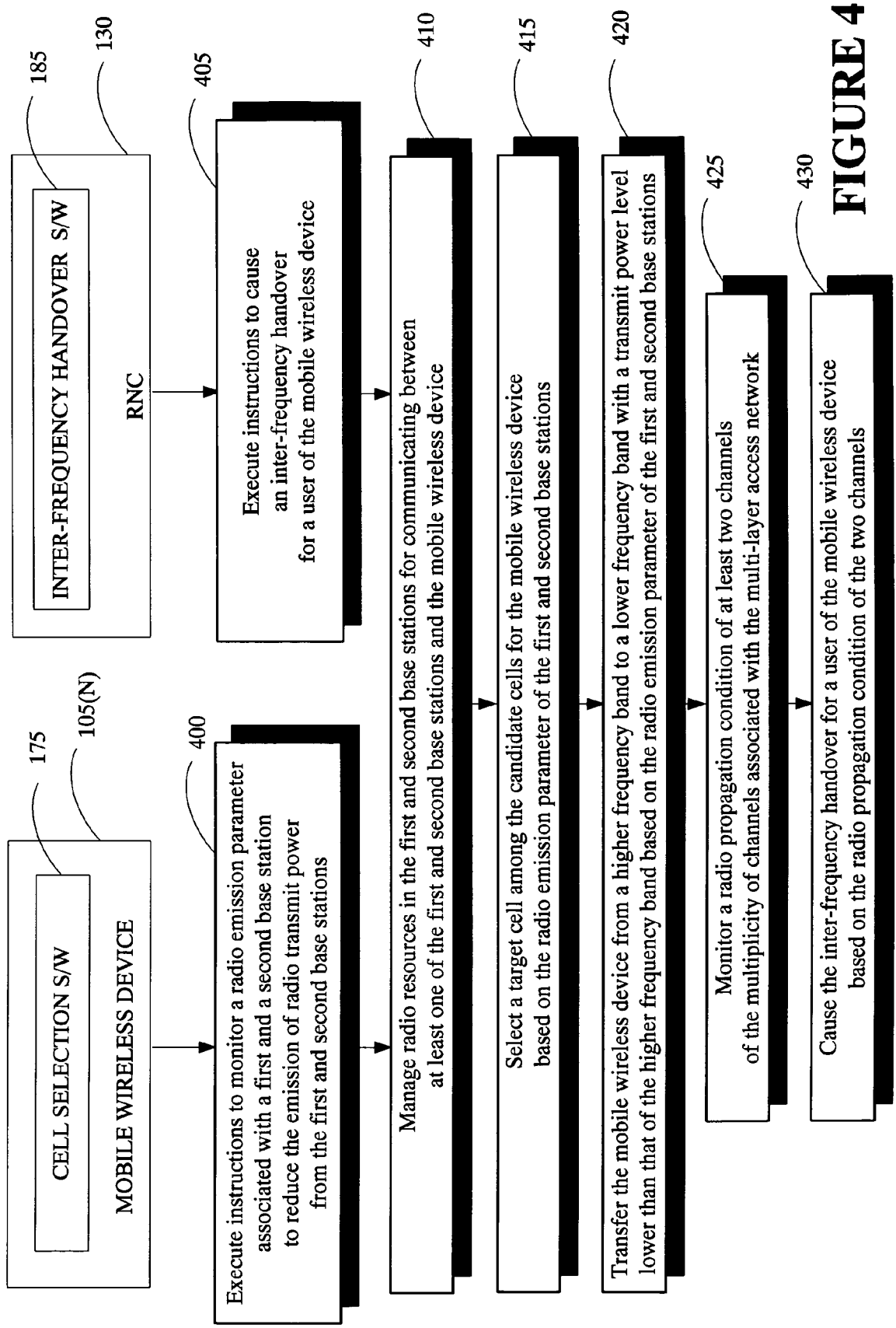
FIG. 4 is a flow diagram illustrating one embodiment of a control strategy employed in the communications system of FIGS. 1-2 for selecting a target cell and handling inter-frequency handover between the first and second base stations.

Referring to FIG. 4, a flow diagram illustrates one embodiment of a control strategy employed in the communications system 100 of FIGS. 1-2 for selecting the target cell 210(l) and handling inter-frequency handover between the first and second base stations 120(l-m). Using the S/W 175, at block 400, the mobile wireless device 105(N) may execute instructions to monitor a radio emission parameter associated with each of the first and second base stations 120(l-m) to substantially reduce the emission of radio transmit power from the first and second base stations 120(l-m). Likewise, at block 405, using the S/W 185, the RNC 130 may execute instructions to cause an inter-frequency handover for a user of the mobile wireless device 105(N).

At block 410, the S/W 175 and 185 may cooperatively manage radio resources in the first and second base stations 120(l-m) for communicating between at least one of the first and second base stations 120(l-m) and the mobile wireless device 105(N). Based on the radio emission parameter of the first and second base stations 120(l-m), the target cell 210(l) among the candidate cells 210(1-6) may be selected at block 415 for the mobile wireless device 105(N). Based on each of the radio emission parameter of the first and second base stations 120(l-m), the mobile wireless device 105(N) may be transferred from one frequency band to another frequency band, such as from a higher frequency band to a lower frequency band with a transmit power level lower than that of the higher frequency band, as indicated in block 420. One example of the higher frequency band includes 2000 MHz and examples of lower frequency bands include 900 MHz or 450 MHz.

At block 425, the S/W 175 and 185 may cooperatively monitor a radio propagation condition of at least two channels of the multiplicity of channels associated with the multi-layer access network in the communications system 100. The S/W 185 may cause the inter-frequency handover for a user of the mobile wireless device 105(N) based on the radio propagation condition of the two channels, at block 430.

Thus, in a multi-layer access network, the cell selection and inter-frequency handover may cause transfer of the mobile wireless device 105(N) to frequency bands that require lower transmit power levels to reduce the radio emission (pollution). The operation of the mobile wireless device 105(N) in lower frequencies may provide a less hazardous choice for mobile telecommunication services. Such radio propagation properties may allow for a significant reduction of the common pilot channel (CPICH) power, consequently, that of the emission power of the first and second base stations 120(l-m), and therewith of the resulting radiation intensity. However, certain factors, such as a topology of the terrain, environmental factors and configuration and location of the first and second base stations 120(l-m) may cause situations where directing or redirecting a user to a higher frequency band may result in a relatively less emission from a base station. Therefore, in one embodiment, selection of an appropriate frequency band may be realized based on the mobile wireless device 105(N) and the multi-layer access network based measurements to estimate of the channel properties.

Figure 5:
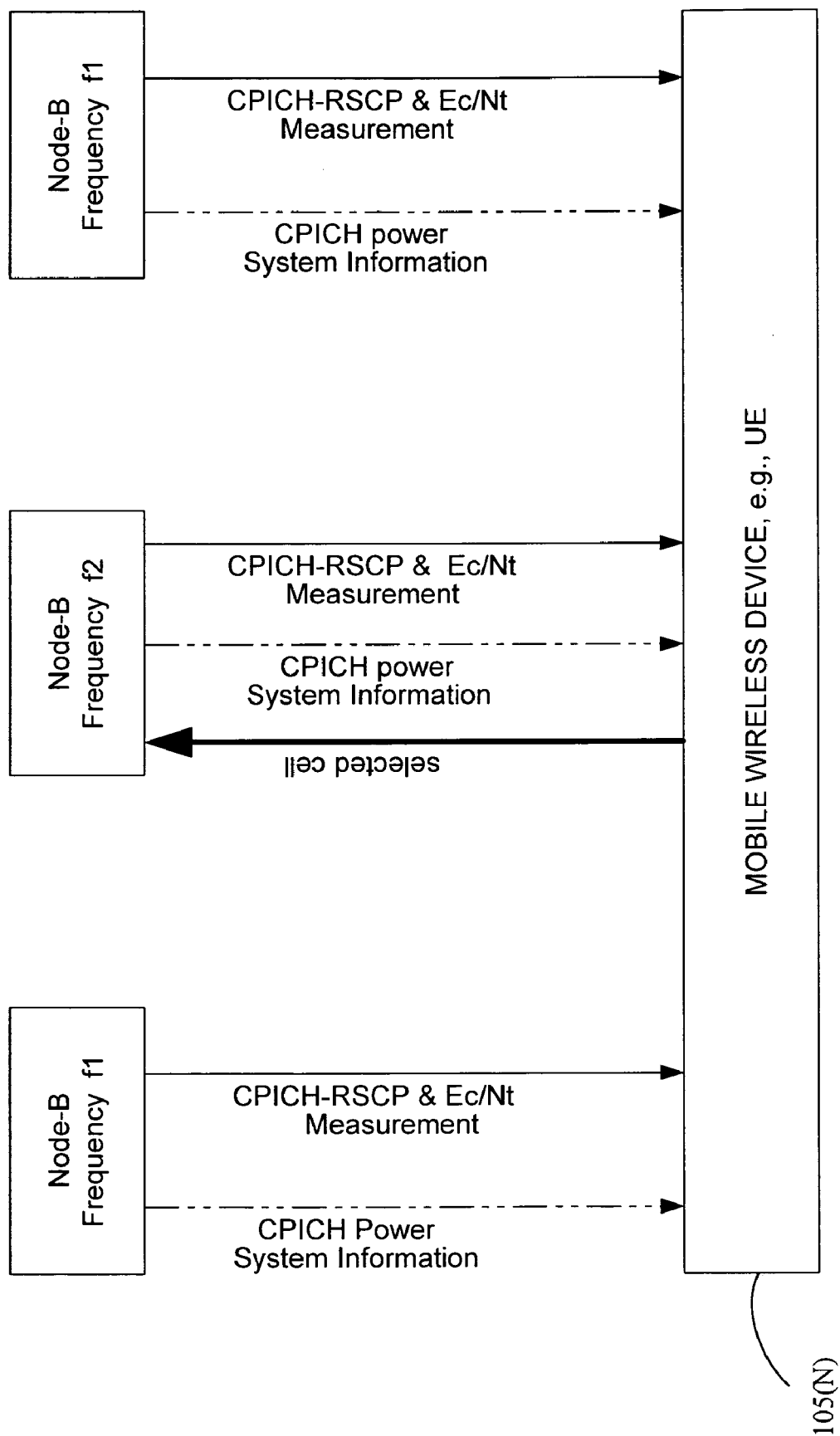
FIG. 5 depicts a flow diagram illustrating an emission-controlled cell selection strategy employed in the communications system of FIGS. 1-2 for selecting a target cell according to one embodiment of the present invention.

Turning now to FIG. 5, a flow diagram depicts an emission-controlled cell selection strategy employed in the communications system 100 of FIGS. 1-2 for selecting the target cell 210(l) according to one embodiment of the present invention. The emission-controlled cell selection strategy may select a suitable cell to serve a user with a lowest power possible. To incorporate a load situation of one or more observed cells, such as the cells 210(1-6), a cell that provides a lowest path loss and in addition fulfills the "C1" criterion, as introduced earlier, may be selected.

$$C1_{rxlev} > 0 \char`\^ C1_{qual} > 0, \tag{1}$$

$$C1_{rxlev} = RXLEV - QRXLEV\_MIN - \max(UE\_TXPWR\_MAX\ RACH - \max\ power, 0)\ C1_{qual} = E_c/N_0 - (E_c/N_0)_{required} \tag{2}$$

where $(E_c/N_t)_{required}$ is the required minimum $E_c/N_t$ value of the CPICH (common pilot channel), e.g $(E_c/N_t)_{required}$ equals −15 dB, RXLEV is the receipt level, QRXLEV_MIN is the minimum required receipt level, UE_TXPWR_MAX RACH is the maximum TX power level a UE, e.g., the mobile wireless device 105(N) may use when accessing the cell on RACH (random access channel) and "max power" is the maximum output power of the UE. Since the selected cell provides the lowest path loss, the emitted power of the first and second base stations 120(l-m) may be reduced at an initial access.

In one embodiment, an emission-controlled cell selection algorithm may be implemented in the UE, i.e., the mobile wireless device 105(N) and may execute as follows with appropriate 3GPP-standard modifications:

1. The UE may measure the $E_c/N_t$ values of all UMTS cells broadcast over a broadcast control channel (BCCH) using a system information block (SIB) field, such as the SIB 11 field.
2. The UE may measure a common pilot channel received signal code power (CPICH_RSCP) in terms of dBm of these cells mentioned in the step 1.
3. The UE may determine the pilot power CPICH_POWER of these cells mentioned in the step 1. The pilot powers may be included in the SIB 11 within a specific field, such as "Cell Info" fields, given in dBm.
4. The UE may calculate the path loss in dB of a cell "i" as follows:

$$L_{path,i} = CPICH\_POWER_i - CPICH\_RSCP_i. \qquad (3)$$

5. The UE may select a cell "k", which provides the lowest path loss from a set "S" of cells which guarantee a minimum required $E_c/N_t$ value as follows:

$$S = \{\forall\, i : C1_{qual,i} > 0 \wedge C1_{rxlev,i} > 0\} \qquad (4)$$

$$k = \left\{ L_{path,k} = \min_{\forall l \in S} (L_{path,l}) \right\}.$$

Figure 6:
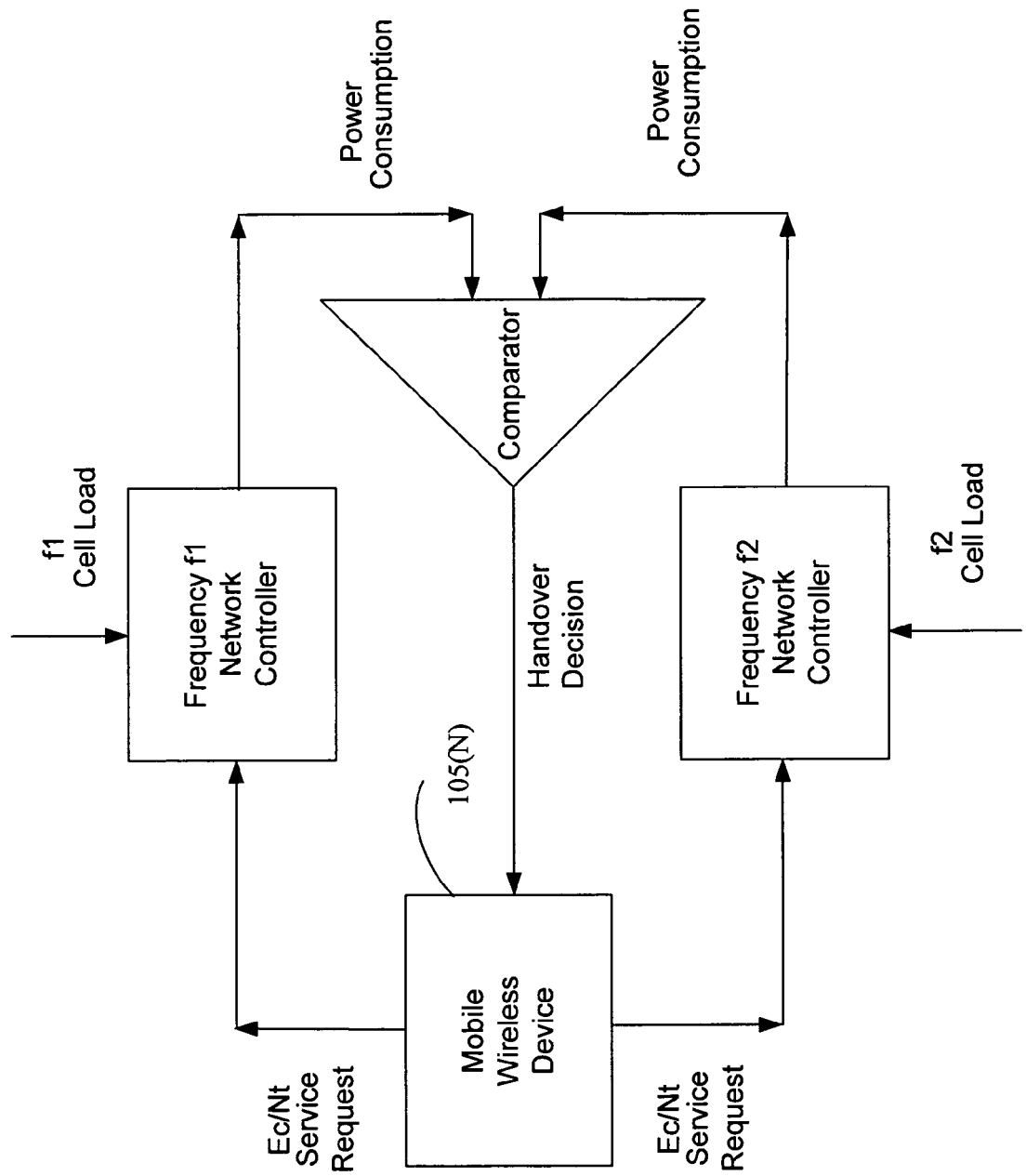
FIG. 6 depicts a flow diagram illustrating an emission-controlled inter-frequency handover strategy employed in the communications system of FIGS. 1-2 for handling inter-frequency handover in accordance with one embodiment of the present invention.

As shown in FIG. 6, a flow diagram illustrates an emission-controlled inter-frequency handover strategy employed in the communications system 100 of FIGS. 1-2 for handling inter-frequency handover in accordance with one embodiment of the present invention. The emission-controlled inter-frequency handover strategy selects the target cell 210(l) to minimize the radiated power. In one embodiment, an emission-controlled inter-frequency handover algorithm may be implemented in the RNC 130, as shown in FIG. 1, and works as follows:

1. The inter-frequency measurements may be started in the UE (via a measurement control message) at a call setup. One or more inter-frequency neighbour cells with $E_c/N_t$ values higher than a threshold value $(E_c/N_t)_{thresh}$ may be reported to the RNC 130 as candidate cells.
2. The RNC 130 may determine the load $L_n$ in the monitored cells. Furthermore, the load $L_a$ of a primary serving cell of an active set of the UE may be determined.
3. The RNC 130 may determine a downlink resource consumption $c_a$ parameter of a service for the UE' in the cells of the active set. Furthermore, the downlink resource consumption $c_n$ of the UE's service within the candidate cells may be estimated (including possible soft handover legs).
4. Using these estimated values, the RNC 130 may calculate an expected power difference in a current system if the UE left the serving cell 205 as $$\Delta P_a = P_{CPICH,a}\left(\frac{1}{1-L_a} - \frac{1}{1-(L_a-c_a)}\right). \qquad (5)$$

5. In the same way, the RNC 130 may calculate an expected power difference for the target cell 210(l) if the UE entered it as $$\Delta P_n = P_{CPICH,n}\left(\frac{1}{1-(L_n+c_n)} - \frac{1}{1-L_n}\right) \qquad (6)$$

6. If the following condition is fulfilled, an inter-frequency handover may be triggered.

$$\Delta P_n + P_{hyst} < \Delta P_a. \qquad (7)$$

The term $P_{hyst}$ prevents a ping-pong behaviour in handover. Use of the above set forth emission-controlled inter-frequency handover algorithm, in some embodiments of the present invention may ensure that the power consumption in a target system, which includes the target cell 210(l) as a new serving cell, is less than the power consumption in the current system which includes the serving cell 205.

Figures 7A, 7B:
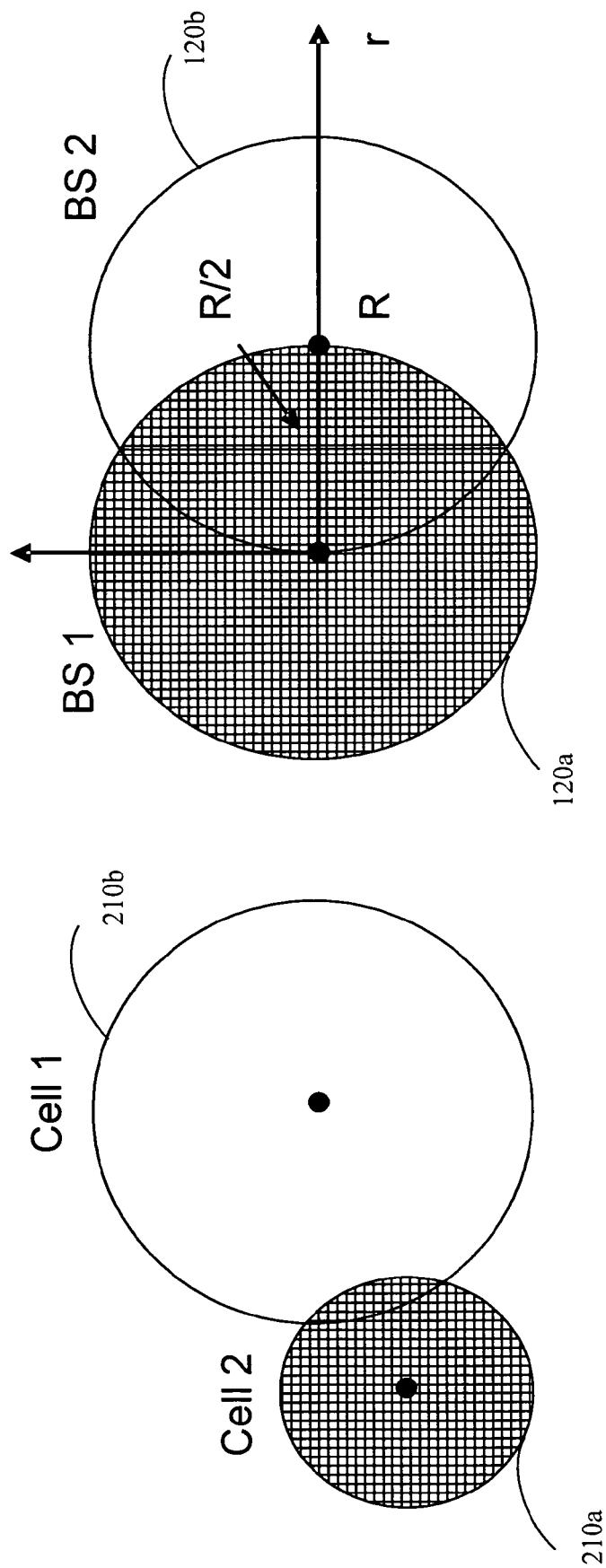
FIG. 7A is a stylistic representation of a macro/micro cell scenario in which the communications system of FIGS. 1-2 may be employed for the emission-controlled cell selection according to one embodiment of the present invention.
FIG. 7B is a stylistic representation of a two cell scenario in which the communications system of FIGS. 1-2 may be employed for the emission-controlled inter-frequency-handover in accordance with one embodiment of the present invention.

Referring to FIG. 7A, a stylistic representation of a macro/micro cell scenario is illustrated in which the communications system 100 of FIGS. 1-2 may provide for an emission-controlled based selection of a cell using the emission-controlled cell selection algorithm described above according to one embodiment of the present invention. In the following Table 1, some examples differentiate a cell selection based on a conventional algorithm and the emission-controlled cell selection algorithm, in which using $(E_c/N_t)_{required} = -15$ dB, the C1 criterion is fulfilled.

TABLE 1

Cell-selection examples

| Scenario | | Cell selected | |
|---|---|---|---|
| Cell 1, f = 450 MHz | Cell 2, f = 2000 MHz | Conventional algorithm | The emission-controlled cell selection algorithm |
| $P_{CPICH}$ = 21 dBm, $E_c/N_t$ = −5.1 dB, $L_{path}$ = 88 dB, $N_{01}$ | $P_{CPICH}$ = 33 dBm, $E_c/N_t$ = −5 dB, $L_{path}$ = 100 dB, $N_{02} = N_{01}$ | Cell 2, as $(E_c/N_t)_2 > (E_c/N_t)_1$ | Cell 1, as $L_{path,1} < L_{path,2}$ |
| $P_{CPICH}$ = 21 dBm, $E_c/N_t$ = −5 dB, $L_{path}$ = 88 dB | $P_{CPICH}$ = 33 dBm, $E_c/N_t$ = −1 dB, $L_{path}$ = 100 dB | Cell 2, as $(E_c/N_t)_2 > (E_c/N_t)_1$ | Cell 1, as $L_{path,1} < L_{path,2}$ |

TABLE 1-continued

Cell-selection examples

| Scenario | | Cell selected | |
|---|---|---|---|
| Cell 1, f = 450 MHz | Cell 2, f = 2000 MHz | Conventional algorithm | The emission-controlled cell selection algorithm |
| $N_{01}$ $P_{CPICH}$ = 21 dBm, $E_c/N_t$ = −1 dB, $L_{path}$ = 88 dB $N_{01}$ | $N_{02} < N_{01}$ $P_{CPICH}$ = 33 dBm, $E_c/N_t$ = −5 dB, $L_{path}$ = 100 dB $N_{02} > N_{01}$ | Cell 1, as $(E_c/N_t)_1 > (E_c/N_t)_2$ | Cell 1, as $L_{path,\,1} < L_{path,\,2}$ |
| $P_{CPICH}$ = 33 dBm, Macro cell, $E_c/N_t$ = −4 dB, $L_{path}$ = 100 dB $N_{01}$ | $P_{CPICH}$ = 21 dBm, Micro cell, $E_c/N_t$ = −5 dB, $L_{path}$ = 88 dB, $N_{02} > N_{01}$ | Cell 1, as $(E_c/N_t)_1 > (E_c/N_t)_2$ | Cell 2, as $L_{path,\,2} < L_{path,\,1}$ |

As shown in the Table 1, by serving a large numbers of users in a particular cell, such as a "Cell 1," 210b the interference increases, and thus, the $E_c/N_t$ decreases. Therefore, if the minimum required $(E_c/N_t)_{required}$ is reached no more users may be admitted to that particular cell. These additional users may automatically select another cell, such as a "Cell 2," 210a.

Referring to FIG. 7B, a stylistic representation of a two cell scenario is depicted in which the communications system 100 of FIGS. 1-2 may employ the emission-controlled inter-frequency-handover algorithm, as illustrated above, in accordance with one embodiment of the present invention. The downlink resource consumption of a service at the UE i.e., the mobile wireless device 105(N) depends, among other things, on the location of the UE within a cell (environment, geometry) and is defined as $$c_i = P_i/P_0, \quad (8)$$

where $P_0$ refers to the total transmitted power from a base station and $P_i$ represents the actual power to serve a user "i." For the purposes of brevity, only two states namely: a "Cell centre" state and a "Cell edge" state are distinguished. At a cell centre, the service consumes less resources than at a cell edge, e.g., as shown in the following Table 2.

TABLE 2

Downlink resource consumption examples

| Service | Downlink resource consumption, cell centre | Downlink resource consumption, cell edge |
|---|---|---|
| 64 kbps (CS) | 3% | 16% |

The measured $E_c/N_t$ values may distinguish these two states. If a soft handover is considered (some $E_c/N_t$ values may need adding), the linear sum of the corresponding $E_c/N_t$ values of that cell set "S" may be calculated as $$\left(\frac{E_c}{N_0}\right)_{tot} = \sum_{j \in S} \left(\frac{E_c}{N_0}\right)_j. \quad (9)$$

If $E_c/N_{t,\,tot} > E_c/N_{t,\,thresh}$ (e.g. −6 dB), then the state is "Cell center", otherwise it is "edge." FIG. 7B shows an example scenario with at least two cells communicatively coupled to the first and second base stations 120(l-m), shown here as base stations "BS 1" and "BS 2," 120a, 120b. Specifically, for $0 \leq r < R/2$, the base station BS 1, 120a is in a "Cell centre" state and the base station BS 2, 120b is in a "Cell edge" state. Conversely, for $R/2 \leq r \leq R$ it is vice versa.

Figure 8:
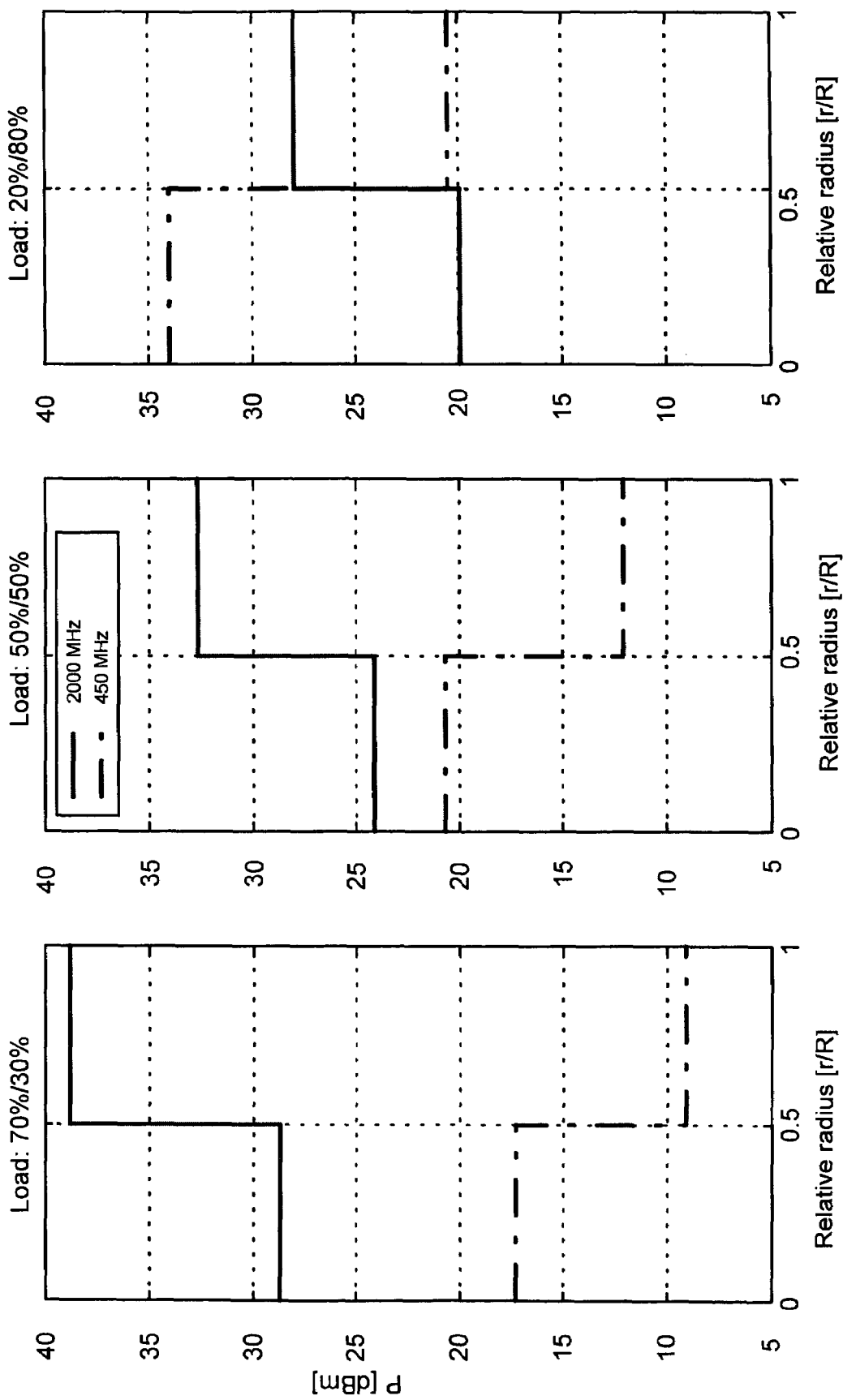
FIG. 8 depicts a graph illustrating transmit power differences as a function of a mobile wireless device's location, such as location of a UE for different load situations including the two cell scenario shown in FIG. 7B in the communications system of FIGS. 1-2 consistent with one embodiment of the present invention.

Consistent with one embodiment of the present invention, FIG. 8 depicts a graph illustrating transmit power differences as a function of a location of the mobile wireless device 105(N), such as location of a UE for different load situations in the communications system 100 of FIGS. 1-2. In FIG. 8, exemplary snapshots of the power differences ΔP in equation (5) and in equation (6) are depicted for different load situations starting from a high load at the base station BS 1, 120a and a low load at the cell BS 2, 120b to a low load at the base station BS 1, 120a and a high load at the base station BS 2, 120b if the UE moves straight on from r=0 to r=R (from BS 1 to BS 2).

Although the total load in both situations is assumed to be constant, in this special example, for a first and a second snapshot from left in FIG. 8, with a BS 1 load and a BS 2 load ranging from 70% & 30% to 50% & 50%, the power difference is indicated to be lower at the base station BS 2, 120b (450 MHz). Thus, the RNC 130 triggers inter-frequency handovers regardless of the UE's position and the load at the base station BS 2, 120b may further rise (and the load at the base station BS 1 decreases). A third snapshot on the right in FIG. 8 shows an equilibrium state where minimum power differences at both the first and second base stations BS 1, 120a and BS 2, 120b are approximately equal. An inter-frequency handover may not be triggered until the UE reaches the "Cell center" state in the base station BS 2, 120b, i.e., (r>R/2).

Figure 9:
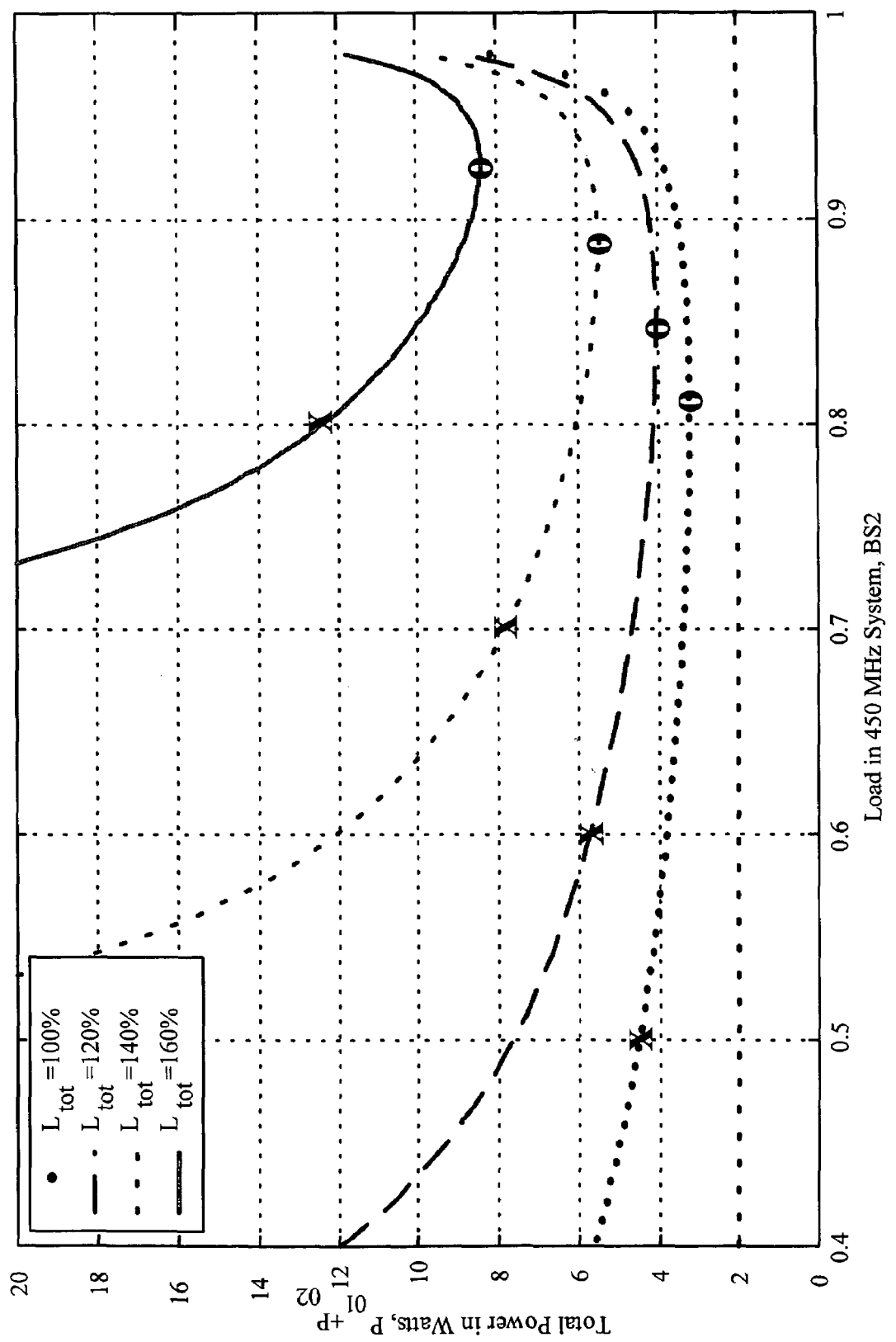
FIG. 9 depicts a graph illustrating one embodiment of total transmission power of both the first and second base stations as a function of the load in the second base station for different total loads with "x" indicating power required by a conventional inter-frequency handover and "o" indicating power required by an emission-controlled controlled inter-frequency handover algorithm in the two cell scenario of FIG. 7B.

Referring to FIG. 9, a graph indicates one embodiment of total transmission power of both the first and second base stations 120(l-m), e.g., the first and second base stations BS 1, 120a and BS 2, 120b shown in FIG. 8. The total transmission power of both the first and second base stations BS 1, 120a and BS 2, 120b is shown as a function of the load in the second base station BS 2, 120b for different total loads with "x" indicating power required by a conventional inter-frequency handover and "o" indicating power required by the emission-controlled controlled inter-frequency handover algorithm indicated in the two cell scenario of FIG. 7B. For example, the total transmission power for different total loads $L_{tot} = \{100\%, 120\%, 140\%, 160\%\}$ (load BS 1+load BS 2) may be given by:

$$P_{tot} = P_{01} + P_{02} = \frac{P_{CPICH1}}{1 - L_{BS1}} + \frac{P_{CPICH2}}{1 - L_{BS2}}. \qquad (10)$$

It can be observed that, e.g., the total power reaches a minimum at a load distribution BS 1: 19%/BS 2: 81% for a total load of 100% (compare FIG. 8, the third snapshot). The points marked by "x" indicate the total power needed by a standard inter-frequency handover procedure, which will be ideally $L_{tot}/2$ (load balanced). Furthermore, the power reduction in the case of the emission-controlled controlled inter-frequency handover algorithm compared to the standard inter-frequency handover procedure will be higher for higher total loads.

Figure 10:
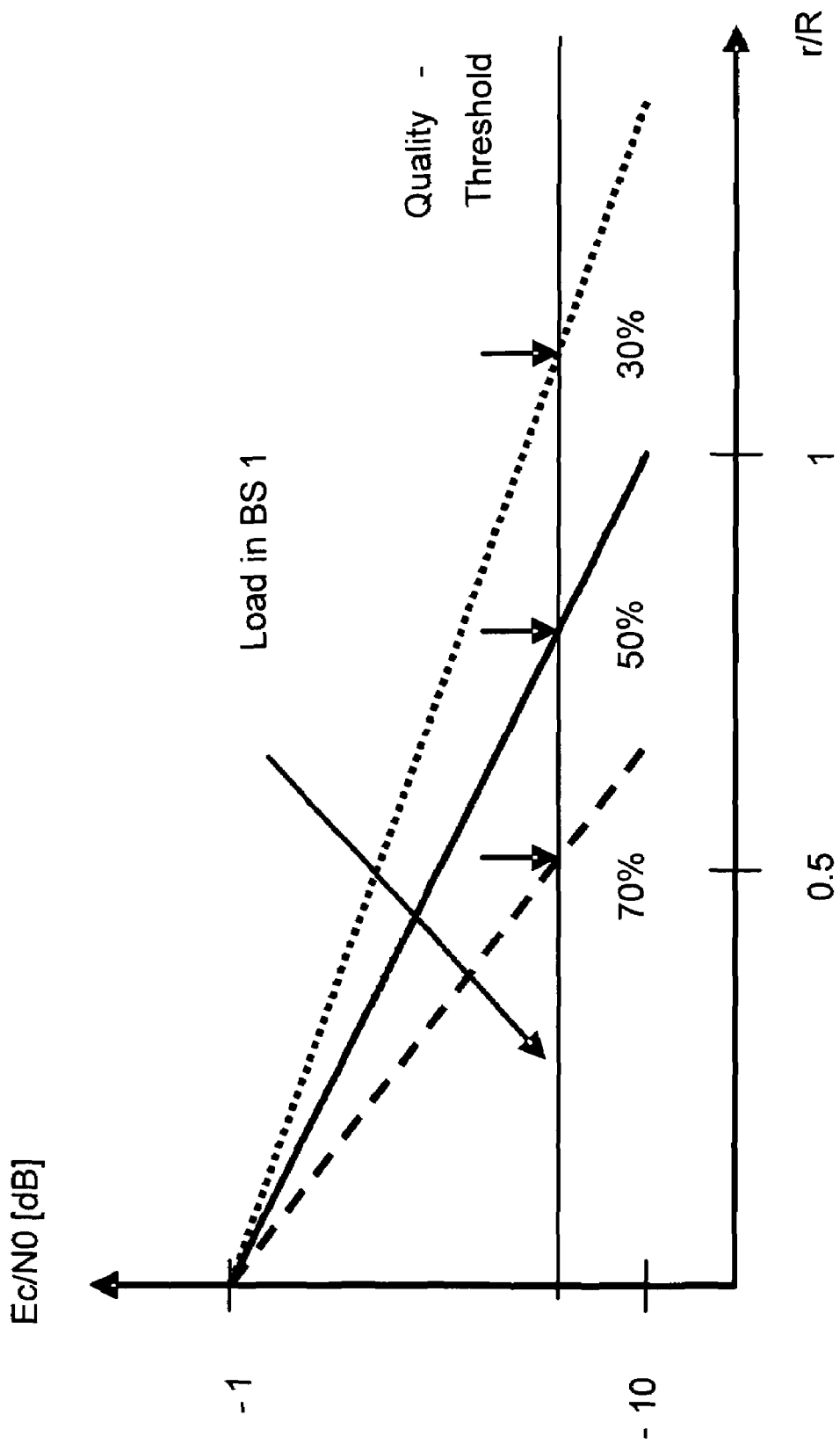
FIG. 10 is a stylistic representation of an inter-frequency handover trigger that may be employed in the communications system of FIGS. 1-2 consistent with one embodiment of the present invention.

Finally, FIG. 10 shows a stylistic representation of a trigger for an inter-frequency handover that may be employed in the communications system 100 of FIGS. 1-2 consistent with one embodiment of the present invention. As one example, a handover may be triggered if a UMTS Terrestrial Radio Access Network (UTRAN) quality in terms of $E_c/N_t$ of the current system (BS 1, f=2000 MHz) becomes worse than a threshold value, e.g., −8 dB. In case of a smaller load, such as of 50% in each cell, the handover may be triggered, e.g., for r=0.8 R since the $E_c/N_t$ now becomes worse (see FIG. 10). In case of a higher load in the base station BS 1, 120a, the handover may be triggered earlier (e.g. for r=0.5 R) because there is substantially more interference.

Of course, a person of ordinary skill will appreciate that these are exemplary scenarios that demonstrate a functional behavior of the communications system 100 using above mentioned algorithms to manage radio resources in the first and second base stations BS 1, 120a and BS 2, 120b. The emission-controlled controlled inter-frequency handover algorithm may trigger the handover at distances r<0.5 R in case of a moderate to a high load of the base station BS 1, 120a, which reduces the emission of the first and second base stations BS 1, 120a and BS 2, 120b coupled to the multi-layer access network.

Advantageously, in some embodiments of the present invention, the emission-controlled controlled inter-frequency handover algorithm ensures that the power consumption in the target system is significantly less than the power consumption in the current system. The emission-controlled cell selection and inter-frequency handover algorithms take advantage of lower frequency bands. Furthermore, other factors, including specific topological environments (cell sizes, base station locations, obstacles which impact the propagation), but are not limited to, may reduce, e.g., minimize the power which is needed to serve the mobile wireless device 105(N).

The emission-controlled cell selection and inter-frequency handover algorithms may be implemented in UMTS-based products and any other wireless network products, e.g., 3G1X. Accordingly, the power or radio emission of the first and second base stations 120(l-m) of FIG. 1, as shown the base stations "BS 1" and "BS 2," 120a, 120b in FIG. 7B and that of the mobile wireless device 105(N) may be substantially decreased resulting in less energy costs and less environmental impacts. This reduction in power or radio emission may favorably affect public acceptance and market penetration of many UMTS/3G1X products, especially with regard to electromagnetic exposure regulations and user demands.

Portions of the present invention and corresponding detailed description are presented above in terms of software, or algorithms and symbolic representations of operations on data bits within a storage device or a semiconductor memory associated with a computing device, such as a computer or controller. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computing system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital versatile disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for allocating frequency bands to users on a multiplicity of channels associated with a multi-layer access network across at least two cells communicatively coupled to a first and a second base station, respectively, the method comprising:

monitoring a radio emission parameter associated with said first and second base stations; and based on the radio emission parameter of said first and second base stations, selecting a target cell among said at least two cells for a mobile wireless device for transferring said mobile wireless device from a first frequency band to a second frequency band having a transmit power level lower than that of said first frequency band, further comprising selecting said target cell among said at least two cells based on the radio emission parameter of said first and second base stations and a radio propagation condition of at least two channels of said multiplicity of channels associated with said multi-layer access network, wherein selecting said target cell comprises selecting said target cell that provides the lowest path loss from a set of cells that guarantee a desired value of a ratio of a received pilot power from a sector to a total interference so that emission of radio transmit power from said first and second base station is reduced upon an initial access of said target cell by said mobile wireless device; selecting said target cell among said at least two cells based on the radio emission parameter of said first and second base stations and a radio propagation condition of at least two channels of said multiplicity of channels associated with said multi-layer access network; selecting said target cell as a cell with a lowest path loss and a cell that fulfils at least one of a cell selection criterion and cell reselection criterion; executing instructions at said mobile wireless device to reduce the emission of radio transmit power from said first and second base stations, wherein executing instructions at said mobile wireless device further comprises:

measuring a ratio of a received pilot power from a sector to a total interference defined as the sum of received power from one or more other sectors and a thermal noise of said at least two cells;

measuring received signal code power of a common pilot channel of said at least two cells;

determining a pilot power for said common pilot channel of said at least two cells; and calculating the path loss of each cell of said at least two cells based on the corresponding pilot powers.

2. A method for allocating frequency bands to users on a multiplicity of channels associated with a multi-layer access network across at least two cells communicatively coupled to a first and a second base station, respectively, the method comprising:

monitoring a radio emission parameter associated with said first and second base stations; and based on the radio emission parameter of said first and second base stations, selecting a target cell among said at least two cells for a mobile wireless device for transferring said mobile wireless device from a first frequency band to a second frequency band having a transmit power level lower than that of said first frequency band;

triggering the inter-frequency handover if a sum of a predetermined power and a second expected power difference remains less than a first expected power difference to ensure that the power consumption in a target system is less than the power consumption in the current system, the first expected power difference representing a power difference if said mobile wireless device leaves a cell of said at least two cells in a current system and the second expected power difference representing a power difference if said mobile wireless device enters said target cell; and executing instructions at a radio network controller to cause the inter-frequency handover from the first frequency band to the second frequency band for said user of said mobile wireless device.

3. A method, as set forth in claim 2, wherein executing instructions at said radio network controller further comprising:

initiating one or more inter-frequency measurements at said mobile wireless device at a call setup;

reporting to said radio network controller one or more inter-frequency neighbor candidate cells of said at least two cells based on values of a ratio of a received pilot power from a sector to a total interference defined as the sum of received power from one or more other sectors and a thermal noise of said at least two cells relative to a threshold value;

determining a load in each of said monitored at least two cells;

estimating a downlink resource consumption of a service for said mobile wireless device in said one or more inter-frequency neighbor candidate cells of said at least two cells;

calculating the first expected power difference in said multi-layer access network if said mobile wireless device leaves the cell of said at least two cells in the current system; and calculating the second expected power difference in said multi-layer access network if said mobile wireless device enters said target cell.

* * * * *